June 2, 1936.  A. E. NELSON  2,042,857
METHOD OF CONDITIONING FRUIT
Filed May 1, 1933
Fig. 1.
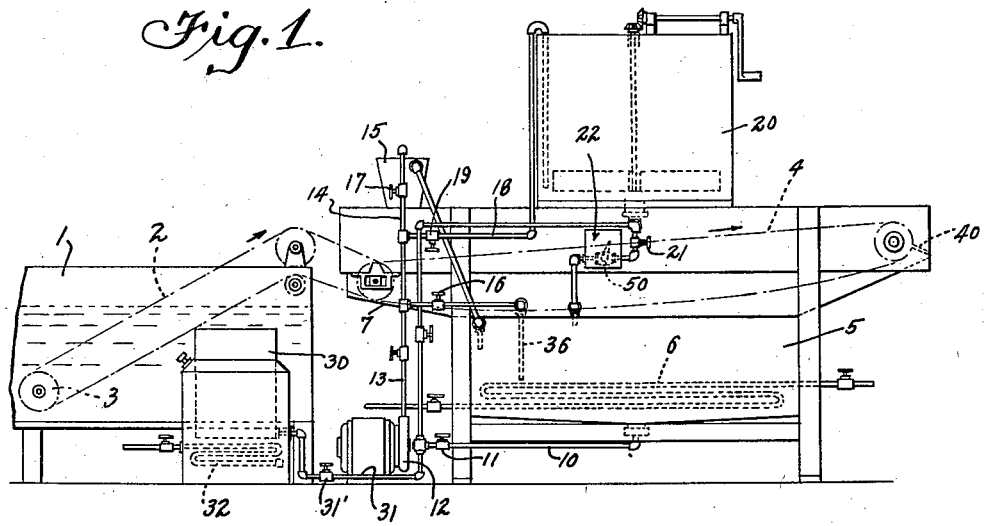
Fig. 2.
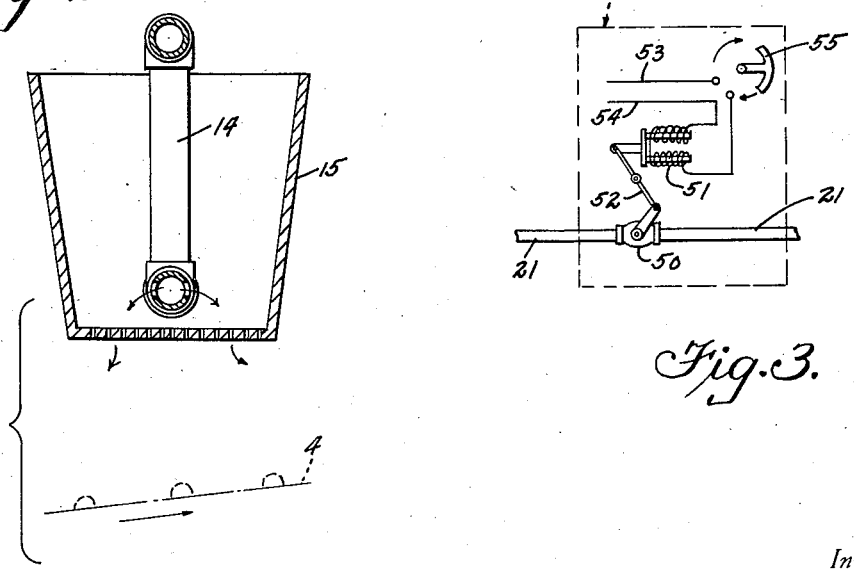
Fig. 3.
Inventor
Arthur E. Nelson
By Lyon & Lyon
Attorneys Patented June 2, 1936

2,042,857

UNITED STATES PATENT OFFICE 2,042,857

METHOD OF CONDITIONING FRUIT

Arthur E. Nelson, Arcadia, Calif., assignor to California Fruit Growers Exchange, Los Angeles, Calif., a corporation of California Application May 1, 1933, Serial No. 668,731

1 Claim. (Cl. 91—68)

This invention relates to a method particularly adapted for use in the processing and conditioning of fruit for the market. The invention is not limited to a method for use in the conditioning of citrus fruits but has particular applicability for use in the treatment of citrus fruits.

Those skilled in the art are well aware that in order to place the fruit in proper condition for sale in distant markets, it is generally necessary to wash the fruit so as to remove dirt, smudge, etc., and also to treat the fruit with a suitable antiseptic or mold-inhibiting treating agent so that the fruit will not deteriorate or become moldy during shipment and storage prior to sale to the ultimate consumer. The treatment of fruits, and particularly citrus fruits, with treating agents which inhibit or retard the development of mold has been practiced for some years and numerous treating agents have been suggested and used for this purpose.

A further step in the conditioning of citrus fruits consists in the application of an oily or waxy substance to the surface of the fruit. Such oily or waxy substance not only improves the appearance of the fruit by imparting thereto a shiny or glossy appearance but in addition such substances have been found to retard the evaporation of moisture from the fruit, thereby preventing shrinkage or wrinkling. Originally solid waxes were applied to the surfaces of the previously washed and dried fruit but difficulties were experienced in applying such solid waxes uniformly. More recently, treating solutions containing waxes have been used for this purpose.

An object of this invention is to disclose and provide a method whereby the fruit may be subjected to the action of a treating liquid of a substantially uniform effectiveness.

Another object is to disclose and provide an apparatus capable of maintaining a liquid containing a treating agent at substantially the same concentration.

A further object of the invention is to disclose and provide an arrangement of elements whereby the preparation of treating liquids and their application to citrus fruits may be rapidly and effectively carried out.

These and other objects, uses and advantages of the invention will become apparent to those skilled in the art from the following detailed description, reference being had for purpose of facilitating understanding of the invention, to the appended drawing, in which Fig. 1 diagrammatically represents a side elevation, partly in vertical section, of one form that the apparatus may assume.

Fig. 2 is a more detailed view of the spray means.

Fig. 3 is a more detailed representation of means for periodically injecting a make-up solution into the system.

Although the apparatus of this invention is not limited to its use in the conditioning of citrus fruits, still the subsequent description will deal with the adaptation of the apparatus to the treatment of citrus fruit for purposes of illustration. Fresh fruit from the grove is seldom clean. Citrus groves are extensively cultivated and are generally sprayed for the control of various insects, fungi and the like. Furthermore, it is frequently necessary to warm the groves by the procedure known as "smudging". These factors are the cause of quantities of dust, dirt, residues, grime, smudge, and the like on the fruit. All of these, as well as other similar foreign matter, must be completely removed from the fruit and the surface thereof presented in a clean and obviously edible condition before the fruit is ready for marketing.

The actual cleansing of the fruit is accomplished by means of suitable detergent materials whose action is ordinarily supplemented by suitable mechanical means such as brushes, rubbing rolls, etc. A considerable number of mechanical devices for washing fruit for the removal of these foreign materials are known in this art. The detergent materials used may vary from simple soap solutions to more complex mixtures of detergents or combinations of detergents and treating agents. By the term "treating agents", reference is made to those materials, substances or compounds which exert a sterilizing or inhibiting effect adapted to prevent the development of molds or spores and to also include those treating agents which leave a residual film of oily or waxy material on the fruit.

Application of a waxy coating to fruit has heretofore presented a number of problems, among them being the regulation of quantity of wax applied. In one of the prior methods of applying waxy materials, it was brought into liquid condition by means of heat and then passed through atomizers for the purpose of creating a zone filled with a fog of atomized waxy material. The rate at which the wax is forced through the atomizers is the only method of control available. Under practical operating conditions the fruit passes through the various mechanisms handling it with a surprising degree of irregularity, and on that account when a comparatively small amount of fruit is passing through the atomizing chamber a comparatively large amount of wax is being applied to the fruit, and when a large amount of fruit is passing therethrough a much lesser amount of wax is available to be applied to it.

In another process of the prior art, the fruit passes over one or more brushing or rubbing rolls or the like and one or more of these is kept in contact with a slab of solid waxy material. Such devices are regulated by regulating the rate at which the waxy material in the slab form is forced or fed to the contact brushes which transfer the wax to the fruit. In this method, the same difficulties are present and the fruit receive varying quantities of wax.

The apparatus of this invention, however, is readily controlled and it is possible to apply a waxy coating to the fruit in such manner as to secure substantial uniformity of results without regard to the rate at which the fruit passes through the treatment. The apparatus functions to best advantage when the treating agent employed therein is an aqueous wax emulsion.

As shown in Fig. 1, the apparatus may include a washing or treating tank 1 in which the fruit are first washed for the removal of dirt, scale, smudge, and the like. Such tank 1 may be provided with brushes, rubbing rolls, or other well known means for facilitating the washing operation, such means not being shown in the drawing. The washed fruit may be removed from the washing tank 1 by means of an inclined conveyor 2, the lower end of the conveyor being positioned beneath the water level existing in the tank 1, as indicated at 3. Ordinarily, citrus fruit have a tendency to float on the surface of water but by depressing one end of the conveyor, as indicated, the conveyor will pick up fruit from the water and carry the fruit upwardly in the direction indicated by the arrow. The conveyor 2 feeds the washed fruit onto a treating conveyor 4. This treating conveyor is slotted or foraminous so as to permit ready drainage of liquid therethrough. A roll type of conveyor may be satisfactorily used.

Positioned beneath the treating conveyor 4 is a treating tank or drip tank 5 provided with suitable means for heating the treating liquid therein. A steam coil 6 is shown in the drawing for this purpose. The drip of treating tank 5 need not be as long as the treating conveyor 4, although it is desirable that means be provided whereby liquid being drained from the fruit on the conveyor 4 passes back into the treating tank 5. An inclined drip pan 7 is shown beneath the forward end of the conveyor 4 for returning liquid into the tank 5.

A conduit 10 provided with a valve 11 leads from the lower portion of the tank 5 to the inlet side of a pump 12. The conduit 13 connects the discharge or outlet of the pump 12 with a line 14 which leads to a suitable spraying or dripping head 15. Valve 17 may be provided in line 14. Means are thus provided for circulating the treating liquid from tank 5 through the pump 12 to the spraying device 15. The spraying device 15 is positioned near the forward end of the treating conveyor 4 at a point above the drip pan 7 so that the treating liquid may shower upon the fruit on the conveyor 4, excess treating liquid being returned to the tank 5.

It is desirable that the treating liquid in tank 5 contain a predetermined proportion of treating agent. When aqueous wax emulsions are used in the treating tank 5, it is desirable, for example, to maintain from about 1% to 5% of wax in the treating liquid. A typical amount of wax is 2.5%. In operation, the treating solution in tank 5 is being constantly depleted, inasmuch as wax is being deposited upon the fruit passing on the treating conveyor 4. In addition, moisture is being brought into the tank 5 by reason of drippings from the fruit, such fruit having just come out of the washing tank 1.

In order to maintain the percentage of wax in the treating liquid at a desired point, a make-up tank 20 is provided. This make-up tank handles a more concentrated form of treating liquid; this more concentrated treating liquid may be periodically or continuously supplied to the treating tank 5 by means of a valved conduit 21. When, for example, it is desired to maintain 2.5% of wax in the treating liquid in tank 5, the make-up tank 20 may contain a wax emulsion of 8% to 15% wax content and this more concentrated treating agent can then be regulatably supplied to the treating tank. Suitable heating means may be positioned in the make-up tank 20 for the purpose of maintaining the treating solution at a desired temperature.

A simple valved conduit, such as the line 21, is not satisfactory for the purpose of maintaining or constantly feeding a desired quantity of make-up solution to the tank. It has been found necessary to employ some more positive means of regulating the addition of the make-up liquid. Such means are generally indicated at 22 in Fig. 1 and may comprise an arrangement of syphon, dipping pivoted buckets, plunger pump with adjustment to regulate length of stroke, flow valve regulators, or electrically controlled and timed feeding means. These periodic regulatable means of supplying make-up solution to the tank 5 have been found to be very satisfactory.

A specific form of such means is indicated in Fig. 3. As there shown, the means for regulating the addition of the make-up liquid comprises a valve 50 located in the line 21, the valve being of the quick-acting type. Such valve is actuated by means of a solenoid 51 suitably connected to the arm of the valve 50 as by means of a lever 52. The coils of the solenoid 51 are actuated by current from lines 53 and 54. The circuit in line 53 is periodically closed by means of a contact member 55 which is caused to follow a circular path, being driven by an electrical motor or electrical clockwork. The length of the arcuate contact bar 55 will, of course, determine the length of time that the circuit is closed, the speed of rotation being constant.

By adjusting the length of the member 55, the solenoid 51 may be actuated for varying lengths of time and the valve 50 thereby opened periodically for a regulatable and definite number of minutes per unit length of time. Devices of this sort may be caused to close the circuit leading to the solenoids for periods of time varying from about 1 second to 10 minutes. The operator can soon determine the rate at which it is necessary to add the more concentrated make-up solution to the tank, adjust the length of the element 55 accordingly, and thereafter regulated quantities of the make-up solution are caused to feed into the tank 5 periodically.

In the preparation of aqueous wax emulsions, the solid wax needs first be melted and emulsified with water. Large volumes of emulsion are used but in order to conserve heat and at the same time maintain a sufficient amount of a treating liquid available, the following arrangement has been found to be very effective:

A stock tank 30 is provided, this stock tank being connected by means of a valved conduit 31 with the inlet of the pump 12. Means for heating the contents of the stock tank 30, such as the steam coils 32, or electric heaters, may be positioned in the tank 30. It is desirable to have this tank 30 of double boiler type, the heating elements being positioned in the lower container so as to indirectly heat the contents of the tank 30 as such arrangement will prevent the wax stock in the tank 30 from being subjected to temperatures of over 212° F. A line 18 provided with a valve 19 is connected to line 13 and the make-up tank 20.

The spray means 15 are designed to cause a gentle stream of treating solution to flow over the fruit passing under the spray means on the conveyor 4. As shown in Fig. 2, this spray means may comprise a small trough or tank of a length depending upon the width of the conveyor 4. The bottom of the tank is perforated with small holes on the order of 1/16" to 1/8" in diameter. The feed line 14 terminates in a substantially horizontal header provided with large outlet holes under its length so that the emulsion entering the header is uniformly distributed over the bottom of the spray means 15 and permitted to flow through the perforated bottom in the form of a gentle spray. Preferably the element 15 is removable for cleaning purposes.

It is thus seen that a very compact and flexible arrangement of elements has been provided whereby the washed fruit from the washing tank 1 are conveyed by the conveyor 2 and deposited upon the treating conveyor 4. When a waxy aqueous emulsion is used in the treating tank 5, the solid waxes are liquefied in the stock tank 30. For example, the wax stock may contain from 40% to 70% of paraffine, 4% to 10% of carnauba wax, 6% to 12% of a vegetable oil such as cottonseed, 15% to 22% of oleic acid, 7% to 11% of triethanolamine, and a small quantity (less than 0.25%) of pine oil or citrus terpenes. Such wax stock is then liquefied and dissolved in a suitable hydrocarbon solvent in the stock tank 30 in the proportion of from about 30% to 90% of wax stock and 10% to 70% of solvent, and heated to approximately 160–170° F.

When the make-up emulsion is to be made, tank 5 is generally emptied of the wax emulsion and a 1% solution of soda ash is placed in said tank 5. This is then heated to approximately 95–110° F. and circulated through the pump by means of line 10, valve 11, line 13, line 36 and valve 16, all other valves being closed. While this soda solution is being circulated, valve 31' is gradually opened which allows some of the melted wax stock to enter the circulating stream and as this stream enters the pump, it is thoroughly mixed before being discharged into tank 5 in the form of an emulsion.

This operation is continued until all of the wax stock in tank 30 has been used. An operation of this sort results in an emulsion containing 8% to 12% of wax in tank 5, the specific content of wax depending upon the amount of water and wax stock used. This emulsion is then pumped into the make-up tank 20 by opening valve 19 and closing valve 16.

A 1/2% soda ash solution is now placed in tank 5 and a sufficient amount of the make-up emulsion introduced thereinto from the make-up tank 20 to give a desired wax concentration in the tank 5.

After the treating tank 5 has been filled with the final emulsion and the make-up tank 20 has been filled with the desired make-up solution, valves 31', 16, and 19 are closed and the treating solution then circulated from the tank 5 through the pump 12 and into the spray or drip means 15. During the subsequent operating period the make-up solution is periodically and regulatably supplied to the treating tank 5 through the means 22 so that the percentage of wax stock in the treating tank 5 is maintained substantially uniform.

The arrangement described hereinabove permits the formation of treating solutions even though inflammable components, such as kerosene or gasoline, are contained therein, with the minimum amount of hazard. The necessity of having large storage tanks is obviated and a large volume of fruit may be effectively treated or conditioned for the market with the minimum volume of treating liquid. Furthermore, a single pump is here adapted to handle concentrated stock, a suitable make-up liquid, and a final treating liquid, thereby reducing the cost of the equipment.

After the treating solution has flowed over the fruit on the conveyor 4 and the excess solution has been permitted to drain therefrom back into the treating tank 5, the fruit are passed by the conveyor 4 over an apron 40 which discharges the fruit either into a drier, brushing rolls, or other brushing and polishing means, or other suitable fruit handling apparatus. In the case of citrus fruits, rollers or brushes capable of polishing the fruit are generally employed. The use of aqueous waxy emulsions of the character mentioned hereinbefore generally obviates the necessity of polishing the fruit, as it has been found that the emulsion dries on the surface and leaves the fruit coated with wax and having a desirable appearance. In the case of lemons, it has been found not necessary to dry the lemons either before or after the application of wax, the wax coating drying in storage without shrinkage.

Those skilled in the art will readily appreciate numerous advantages of the arrangement of elements described hereinbefore and the various adaptations and modifications which may be made therein without departing from the spirit of the invention. For example, one change which may be made is to cause the conveyor 4 to pass directly through the treating emulsion in the tank 5, thereby dipping the fruit therein instead of relying upon the spraying action of the spray head 15, or the fruit may be discharged directly into the tank 5 and removed therefrom by means of a conveyor similar to the conveyor 2.

All such changes and modifications as come within the scope of the appended claim are embraced thereby.

I claim:

In the art of conditioning citrus fruits for the market, the steps of: forming an aqueous stock emulsion containing waxy components; forming a body of finished aqueous emulsion from a portion of said stock emulsion, said finished emulsion containing from about 1% to 5% of said waxy components; washing citrus fruit in a detergent solution; bringing said washed citrus fruit while still wet into contact with said finished aqueous emulsion whereby the finished emulsion tends to become diluted; and introducing regulated quantities of stock emulsion containing waxy components into said body of finished emulsion during treatment of citrus fruit therewith to maintain the content of waxy components in said finished emulsion at between about 1% and 5%.

ARTHUR E. NELSON.